United States Patent
Zurian

(10) Patent No.: US 11,177,690 B2
(45) Date of Patent: Nov. 16, 2021

(54) SYSTEM FOR WIRELESSLY SUPPLYING ELECTRICAL POWER

(71) Applicant: B/E Aerospace, Inc., Wellington, FL (US)

(72) Inventor: Charles W. Zurian, Kernersville, NC (US)

(73) Assignee: B/E Aerospace, Inc., Winston-Salem, NC (US)

(*) Notice: Subject to any disclaimer, the term of this patent is extended or adjusted under 35 U.S.C. 154(b) by 586 days.

(21) Appl. No.: 15/816,294

(22) Filed: Nov. 17, 2017

(65) Prior Publication Data

US 2019/0157905 A1 May 23, 2019

(51) Int. Cl.
| | |
|---|---|
| *H02J 50/10* | (2016.01) |
| *B64D 11/00* | (2006.01) |
| *H02J 4/00* | (2006.01) |
| *B64D 47/00* | (2006.01) |
| *B64C 1/14* | (2006.01) |
| *B64D 11/06* | (2006.01) |

(52) U.S. Cl.
CPC .............. *H02J 50/10* (2016.02); *B64D 47/00* (2013.01); *H02J 4/00* (2013.01); *B64C 1/1407* (2013.01); *B64D 11/00* (2013.01); *B64D 11/06* (2013.01); *B64D 2203/00* (2013.01); *B64D 2221/00* (2013.01)

(58) Field of Classification Search
CPC . H02J 50/10; H02J 4/00; H02J 7/0042; B64D 2221/00; B64D 11/06; B64D 11/00; B64D 2203/00; B64D 47/00–06; B64C 1/1407–1469; H01F 38/14
See application file for complete search history.

(56) References Cited

U.S. PATENT DOCUMENTS

| | | | | |
|---|---|---|---|---|
| 8,164,215 | B2 * | 4/2012 | Bauer | H02J 50/10 307/9.1 |
| 2014/0355247 | A1 * | 12/2014 | Ius | D06F 37/267 362/89 |
| 2015/0380946 | A1 * | 12/2015 | Polu | H02J 5/005 307/104 |
| 2016/0039525 | A1 * | 2/2016 | Pajic | B60N 3/004 108/44 |
| 2016/0163139 | A1 * | 6/2016 | Kankkunen | G07C 9/00309 70/91 |
| 2017/0101187 | A1 * | 4/2017 | Noske | B60N 3/004 |
| 2018/0155962 | A1 * | 6/2018 | Mitchell | E05C 7/06 |
| 2018/0202194 | A1 * | 7/2018 | Jaskiewicz | E05B 63/14 |

FOREIGN PATENT DOCUMENTS

| | | | |
|---|---|---|---|
| JP | 2012029881 | A * | 2/2012 |
| JP | 2016191287 | A * | 11/2016 |

* cited by examiner

*Primary Examiner* — Hal Kaplan
*Assistant Examiner* — David A Shiao
(74) *Attorney, Agent, or Firm* — Suiter Swantz pc llo

(57) ABSTRACT

A system may wirelessly supply electrical power to an aircraft cabin component which moves relative to another aircraft cabin component. A first aircraft cabin component may include a solid state electrical power transmitter having an induction loop. The second aircraft cabin component may include a solid state electrical power receiver having a receiving coil. When a power source is connected to the solid state electrical power transmitter, the induction loop creates an oscillating magnetic field which passes through the receiving coil and induces a flow of alternating current through the receiving coil which drives the load.

8 Claims, 8 Drawing Sheets

SYSTEM FOR WIRELESSLY SUPPLYING ELECTRICAL POWER

BACKGROUND

Aircraft cabin interiors may include many moveable components such as doors, seats, or tray tables. Aircraft cabin interiors may also include various electrical devices which require electrical power such as lights, motors, or ports supporting the connection of personal devices such as cellular phones, laptop computers, or media players. Further, these various electrical devices may be located on one or more moveable components.

When an electrical device is located on or in a moveable aircraft component, it is necessary to provide electrical power to the electrical device. This power may be supplied by a battery, a wired connection, or a contact connection. Batteries have a finite life, may be expensive, and must be frequently replaced. Wired connections requiring a wire passing across a moveable connection will bend or flex as the moveable aircraft component moves in relation to another component. Over time, the metal wire may suffer metal fatigue and fail. Similarly, contact type electrical connections where one piece of metal is in physical contact with another piece of metal may fail over time due to friction and abrasion between the two pieces of metal as the components move.

Aircraft cabins are unique environments which often temporarily house humans thousands of feet in the air. Aircraft cabins may have interior doors serving various purposes. For instance, a door may separate one cabin from another; a door may add privacy to a lavatory or other bathroom facility; or a door or movable partition may enclose a premium aircraft suite. In the event of an emergency, it may be necessary to not just open the aircraft cabin interior door but to remove the door for the egress of passengers.

SUMMARY

In one aspect, embodiments of the inventive concepts disclosed herein are directed to a system for wirelessly supplying electrical power from one aircraft component to another. This inventive concept allows electrical power to be transferred to an aircraft component which moves without requiring wires or physical contact. This inventive concept may include a first aircraft cabin component equipped with a solid state electrical power transmitter. The solid state electrical power transmitter may include an induction loop. The induction loop may be adapted to produce an oscillating magnetic field when powered via a wired connection to a power supply. This invention concept may also include a second aircraft cabin component which is movable relative to the first aircraft cabin component. The second aircraft component may be equipped with a solid state electrical power receiver. The solid state electrical power receiver may include a receiving coil which is adapted to induce a flow of alternating current to a load when the receiving coil is in proximity to the oscillating magnetic field.

In a further aspect, the second aircraft cabin component may be movable between a first position in which the power receiver is within operating range of the power transmitter, and a second position in which the power receiver is out of operating range of the power transmitter. In addition to the first and second positions, there may be additional intermediate positions between the first and second position. When the second aircraft cabin component is in one of these intermediate positions, the flow of alternating current is diminished. In an alternate embodiment, whether the second aircraft cabin component is in the first or second position, the power receiver remains in operating range of the power transmitter.

In a further aspect, the first and second aircraft cabin components may be moveably attached to one another. According to such an embodiment, the second aircraft cabin component may be a tray table, a door, or a seating element. The inventive concept will allow electrical power to wirelessly pass across a moveable element including a tray table hinge or a door slide. This inventive concept will allow power to be transferred to the tray table, door, or seating element without requiring a wire or other physical connection to supply power to the tray table, door, or seating element.

In a further aspect, the first aircraft component may be rotatably attached to the second aircraft component. According to such an embodiment of the inventive concept, the second aircraft component may be a control knob. This inventive concept will allow power to be transferred to the control knob without requiring a wire or other physical connection to supply power to the knob.

In a further aspect, the load, which is powered by the solid state electrical power receiver, may be a light emitting diode or a personal electronic device. The personal electronic device may be a cellular phone, a tablet computer, a media device, or a laptop computer.

In another aspect, embodiments of the inventive concepts disclosed herein are directed to a method of wirelessly supplying electrical power to aircraft cabin components. The method may include several steps including providing a first aircraft cabin component; providing a second aircraft cabin component which is movable relative the first aircraft cabin component; attaching a solid state electrical power transmitter having an induction loop to the second aircraft cabin component; attaching a solid state electrical power receiver having a receiving coil to the first aircraft cabin component; connecting a load to the solid state electrical power receiver; and connecting a power source to the solid state electrical power transmitter. According to this inventive concept, a further step may include moving the first aircraft cabin component to a position wherein the solid state electrical power receiver is in wireless electrical communication with the solid state power transmitter.

In a further aspect, the first aircraft cabin component may be hingedly connected to the second aircraft cabin component. The second aircraft cabin component may be a door or a tray table. In an alternate embodiment, the first aircraft cabin component may be slidingly attached to the second aircraft cabin component.

In another aspect, embodiments of the inventive concepts disclosed herein are directed to a system for wirelessly supplying electrical power to aircraft cabin components having a first aircraft cabin component and a second aircraft cabin component having a door, a tray table, or a knob. The inventive concept includes a moveable joining element connecting the first aircraft cabin component to the second aircraft component. The joining element may include a hinge, a slide, or a swivel joint. The inventive concept also includes a solid state electrical power transmitter having an induction loop and attached to the first aircraft cabin component. The inventive concept also includes a solid state electrical power receiver having a receiving coil and attached to the second aircraft cabin component. A load may be connected to the solid state electrical power receiver. When a power source is connected to the solid state electrical power transmitter, the induction loop creates an oscillating magnetic field which passes through the receiving coil and induces a flow of alternating current through the receiving coil which drives the load.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
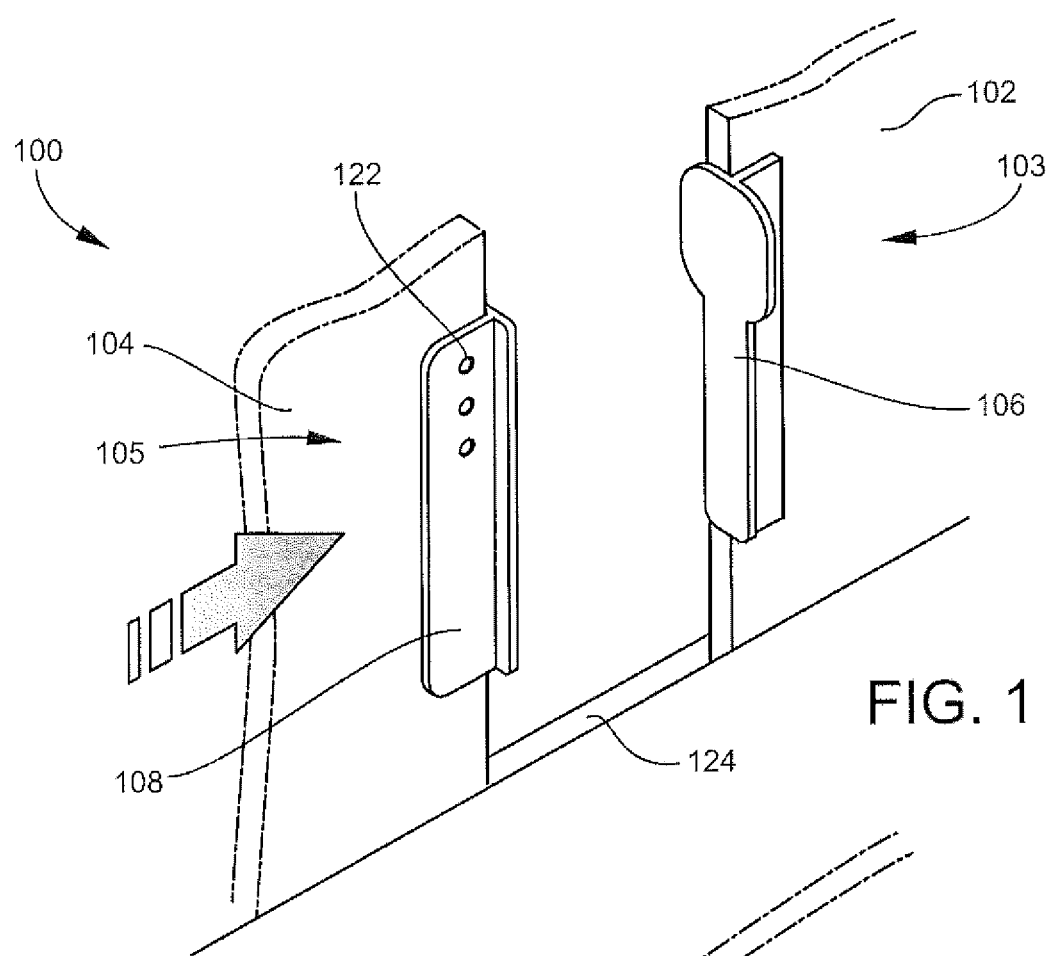
FIG. 1 is a perspective view of an exemplary embodiment according to the inventive concept.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practice without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

The inventive concepts are described hereinafter with reference to the accompanying drawings in which exemplary embodiments are shown. However, the inventive concepts may be embodied in many different forms and should not be construed as limited to the representative embodiments set forth herein.

The inventive concepts disclosed herein are generally directed to a system and method for wirelessly transmitting electrical power to an aircraft cabin component 100.

Figure 2:
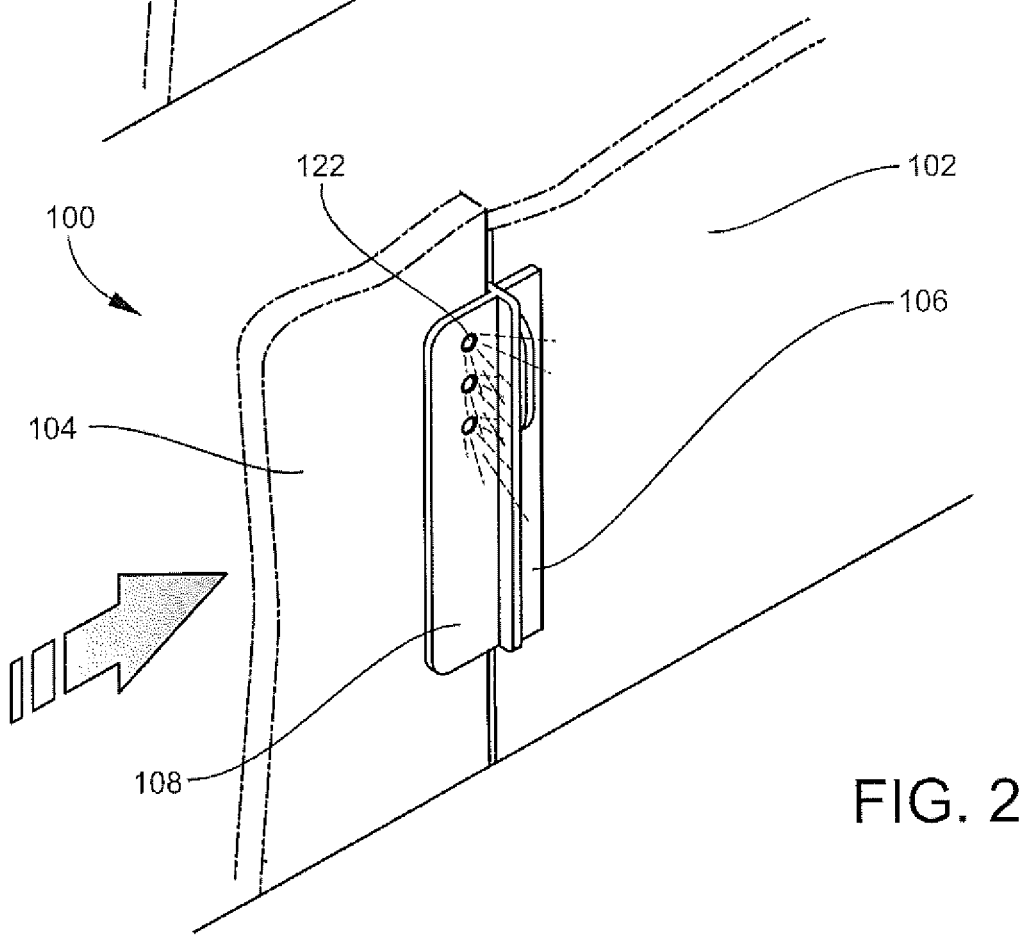
FIG. 2 is a perspective view of an exemplary embodiment according to the inventive concept.
Figure 4:
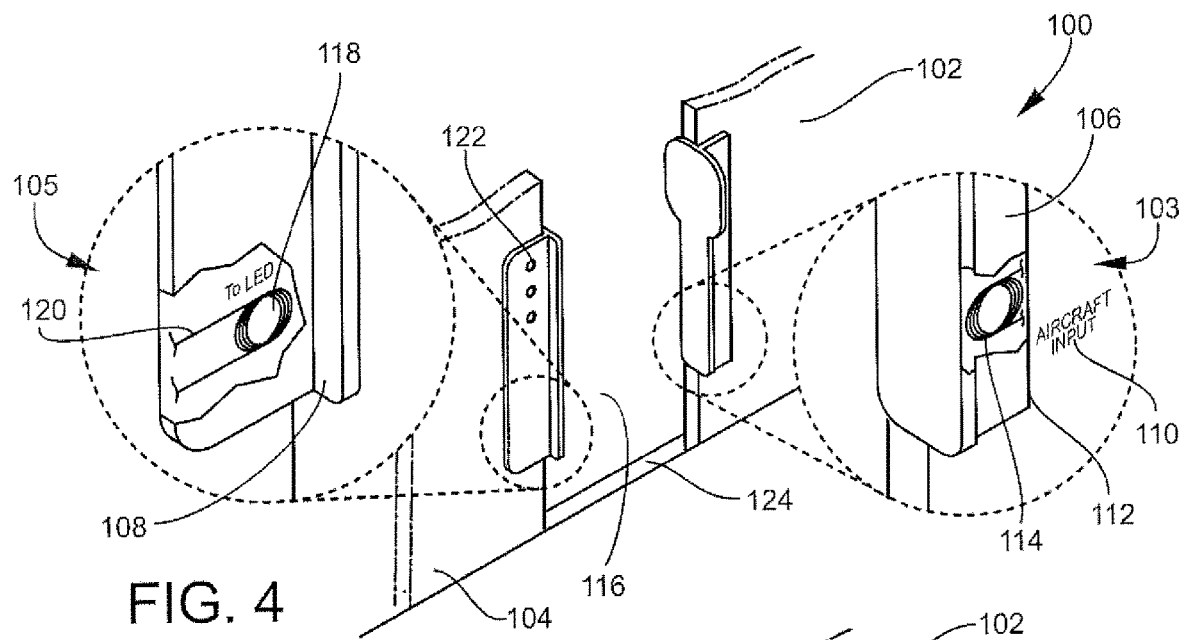
FIG. 4 is a perspective view of an exemplary embodiment which highlights electrical components according to the inventive concept.
Figure 5:
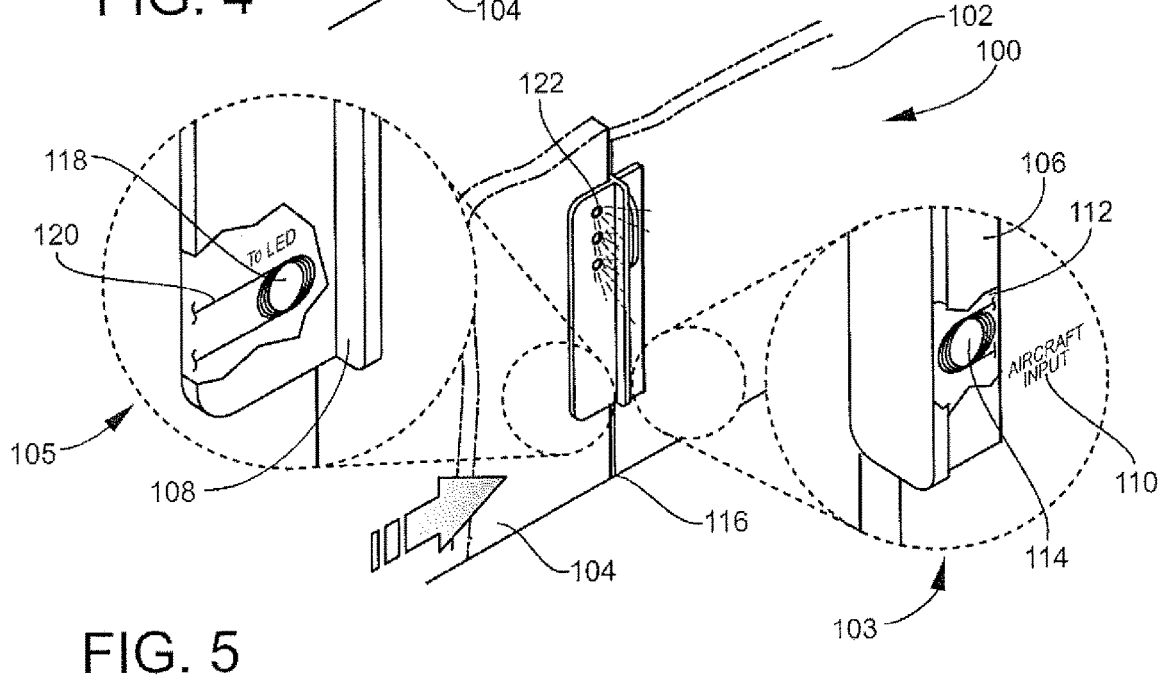
FIG. 5 is a perspective view of an exemplary embodiment which highlights electrical components according to the inventive concept.

In an exemplary embodiment, FIGS. 1, 2, 4, and 5 show a first aircraft cabin component 102 which is fixed in the aircraft passenger cabin. This first aircraft cabin component 102 could be a partition wall, a bulkhead wall, or a cabinet. A second aircraft cabin component 104 moves in a sliding motion along track 124. This second aircraft cabin component 104 could be a door, privacy partition, or other moveable component. As shown, the first aircraft cabin component 102 has a contact guard 106 and second aircraft cabin component 104 has a handle 108. A set of light emitting diodes 122 are attached to the handle 108. FIGS. 1 and 4 show the second aircraft cabin component 104 in an open position which is spaced apart from the first aircraft cabin component 102. FIGS. 2 and 5 show the second aircraft component 104 in a closed position adjacent to the first aircraft cabin component 102.

Figure 3:
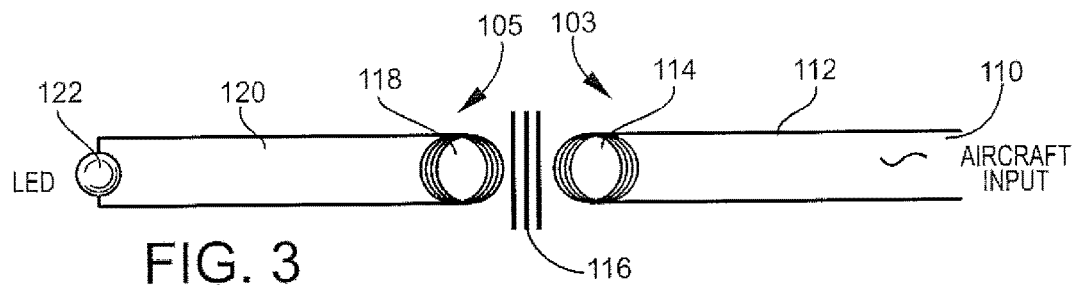
FIG. 3 is an electrical diagram according to the inventive concept.

FIG. 3 is an electrical circuit diagram which shows, generally, a solid state electrical power transmitter 103 and a solid state electrical power receiver 105. The solid state electrical power transmitter 103 is separated from the solid state electrical power receiver 105 by a distance 116. The solid state electrical power transmitter 103 includes an AC aircraft input 110 in a wired connection 112 to an induction loop 114. The induction loop 114 is configured to produce an oscillating magnetic field when power is supplied by the aircraft. The solid state electrical power receiver 105 includes a receiving coil 118 which has a wired connection 120 to a load 122, which as shown, is an LED. One of skill in the art will appreciate that the aircraft could supply either AC or DC power but that if the aircraft supplies DC, the signal will first have to be converted so that AC is provided to the induction loop. Likewise, the load 122 could require either AC or DC power but if it requires DC power, the power would first have to be rectified.

As shown in FIGS. 4 and 5, the solid state power transmitter 103 can be imbedded in the first aircraft cabin component 102. Similarly, the solid state power receiver 105 can be imbedded in the second aircraft cabin component 104.

When first and second aircraft cabin components 102, 104 are adjacent as shown in FIGS. 2 and 5, the induction loop 114 of the solid state power transmitter 103, when connected to the aircraft power source 110, will produce an oscillating magnetic field. This oscillating magnetic field will, in turn, induce the flow of AC current through the coil 118 of the solid state power receiver 105 thereby providing power to the load 122.

As shown in FIGS. 1 and 4, when the first and second aircraft cabin components 102, 104 are spaced apart such that the oscillating magnetic field of the induction loop 114 of the solid state power transmitter 103 does not communicate with the coil 118 of the solid state power transmitter 105, there is no power to the load 122.

Figure 6:
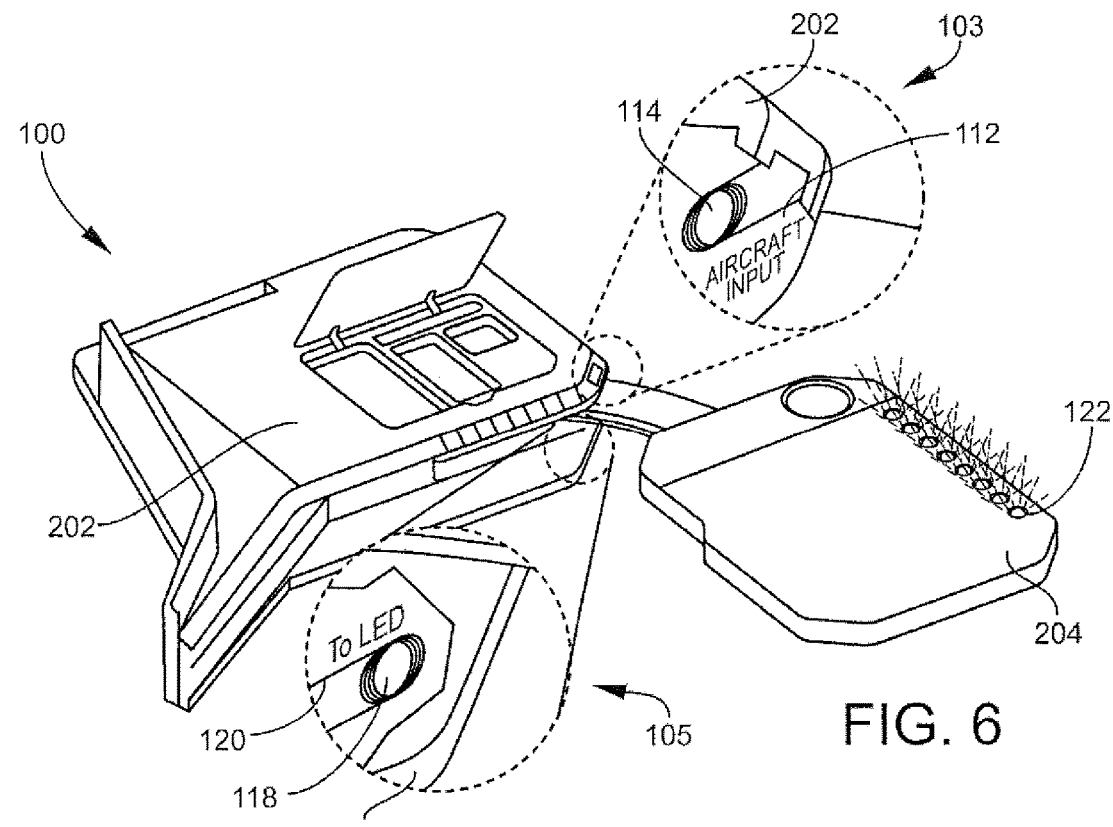
FIG. 6 is a perspective view of an exemplary embodiment which highlights electrical components according to the inventive concept.

Referring now to FIG. 6, an embodiment of the inventive concept 100 is shown where the solid state power transmitter 103 is attached to a fixed aircraft structure 202 and the solid state power receiver 105 is attached to a sliding tray table 204. LEDs 122 are attached to an edge of a tray table 204. As shown, the solid state power receiver 105 is attached to a sliding arm portion of the tray table 204. When the tray table 204 is in the extended position as shown, the solid state power receiver 105 is in proximity to the solid state power transmitter 104, and the LEDs 122 will illuminate. When the tray table 204 is retracted (not shown) in the fixed aircraft structure 202, the solid state power receiver 105 will be deep within the fixed aircraft structure 202 and will be out of communication with the solid state power transmitter 103 such that the LEDs will not have power.

Figure 7:
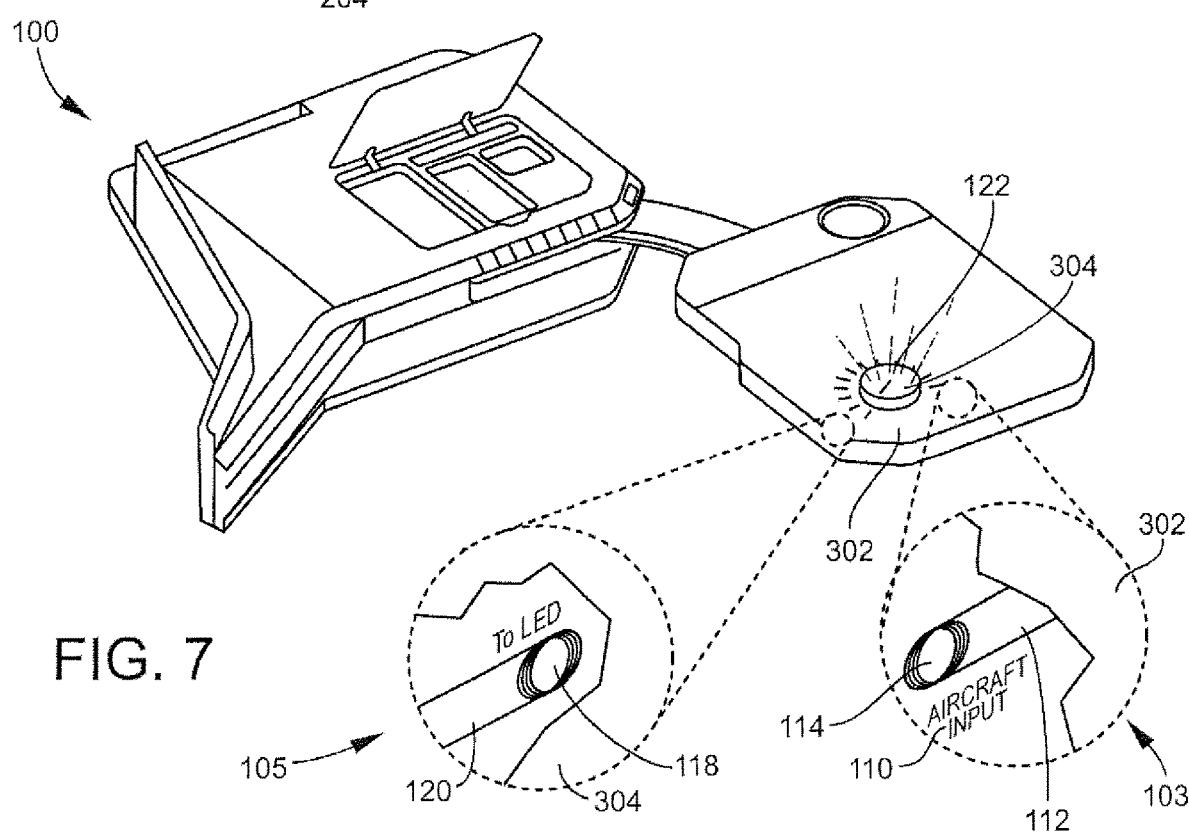
FIG. 7 is a perspective view of an exemplary embodiment which highlights electrical components according to the inventive concept.

Referring now to FIG. 7, an embodiment of the inventive concept 100 is shown where the solid state power transmitter 103 is attached to the tray table 302 and the solid state power receiver 105 is imbedded within a control knob 304. An LED 122 is also imbedded in the knob 304. The knob 304 can rotate about a central axis and may utilize a swivel or other rotating connection to the tray table 302. When AC power from the aircraft 110 is connected via wires 112 to the induction loop 114 of the solid state power transmitter 103, a flow of AC current will be induced across the receiving coil 118 of the solid state power receiver 105 which can be supplied via wire connection 120 to the LEDs 122 in the knob 304. Thus, according to this inventive concept 100, power may be supplied to the knob 304 in order for the knob 304 to be wirelessly illuminated by the LEDs 122 while the knob 304 remains free to rotate as desired.

Figure 8:
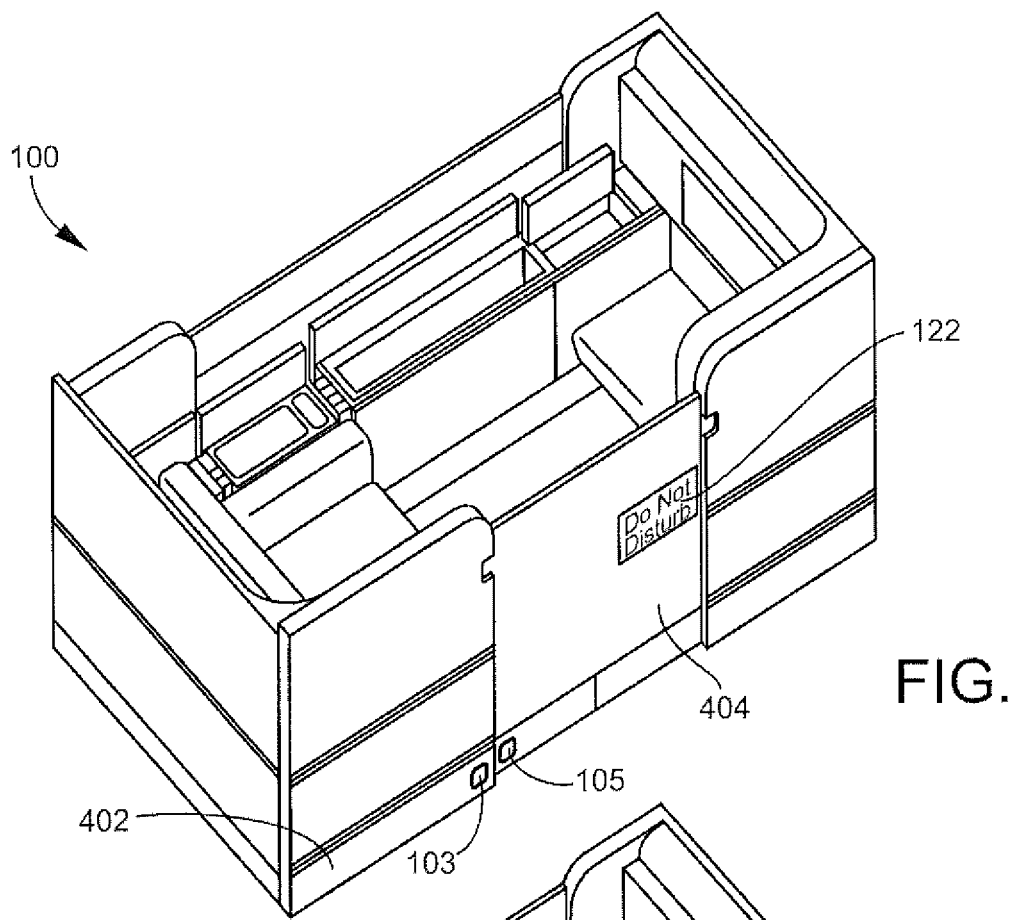
FIG. 8 is a perspective view of an exemplary embodiment according to the inventive concept.
Figure 9:
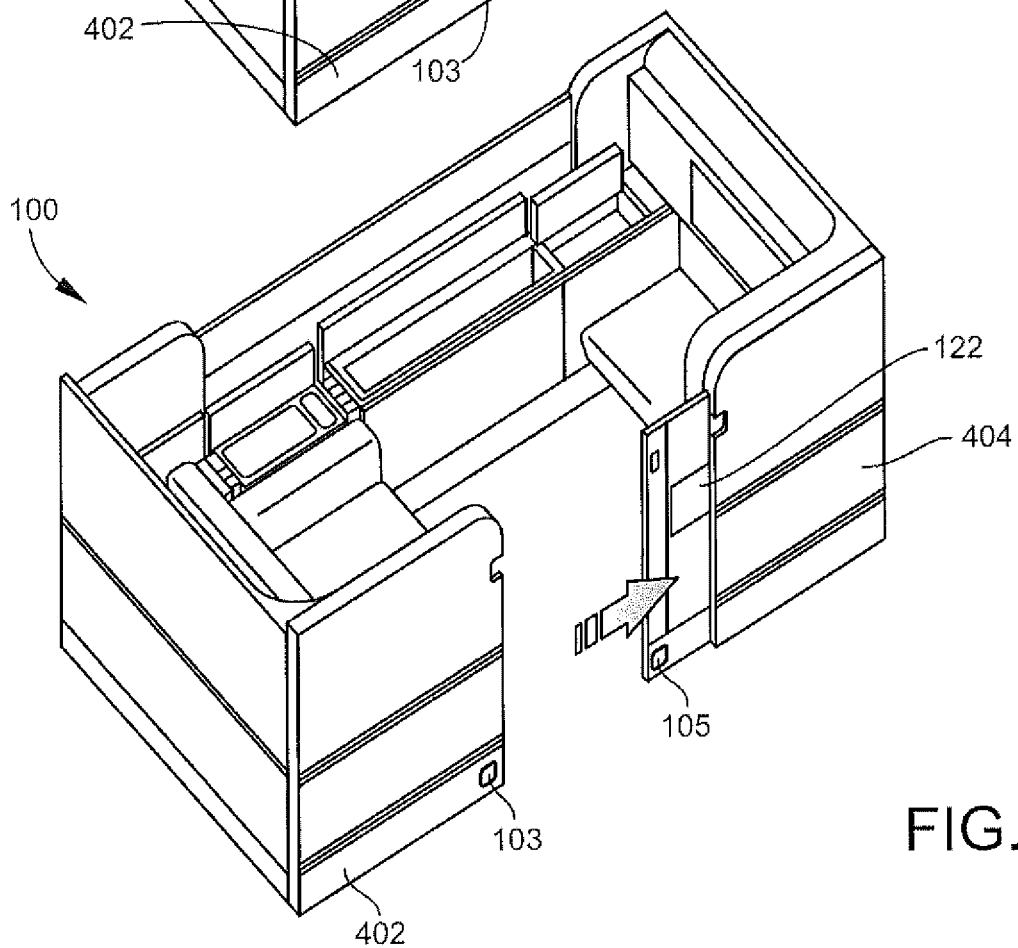
FIG. 9 is a perspective view of an exemplary embodiment according to the inventive concept.
Figure 10:
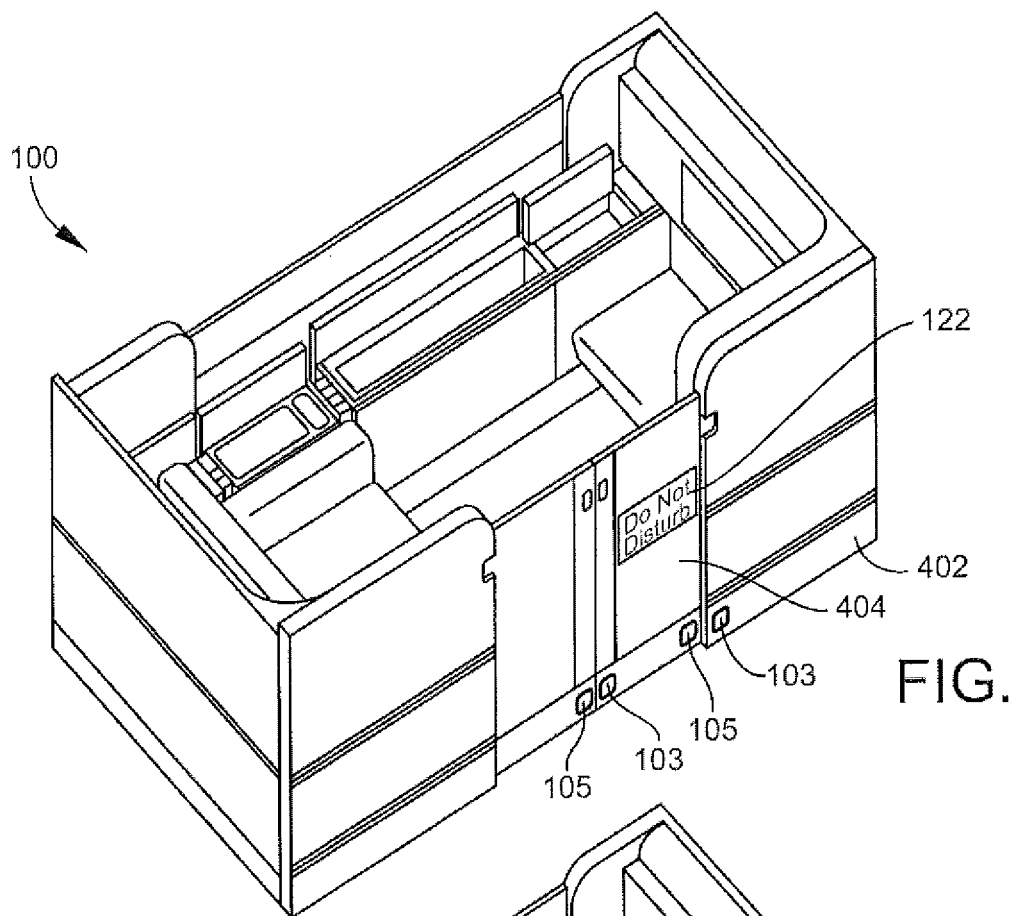
FIG. 10 is a perspective view of an exemplary embodiment according to the inventive concept.
Figure 11:
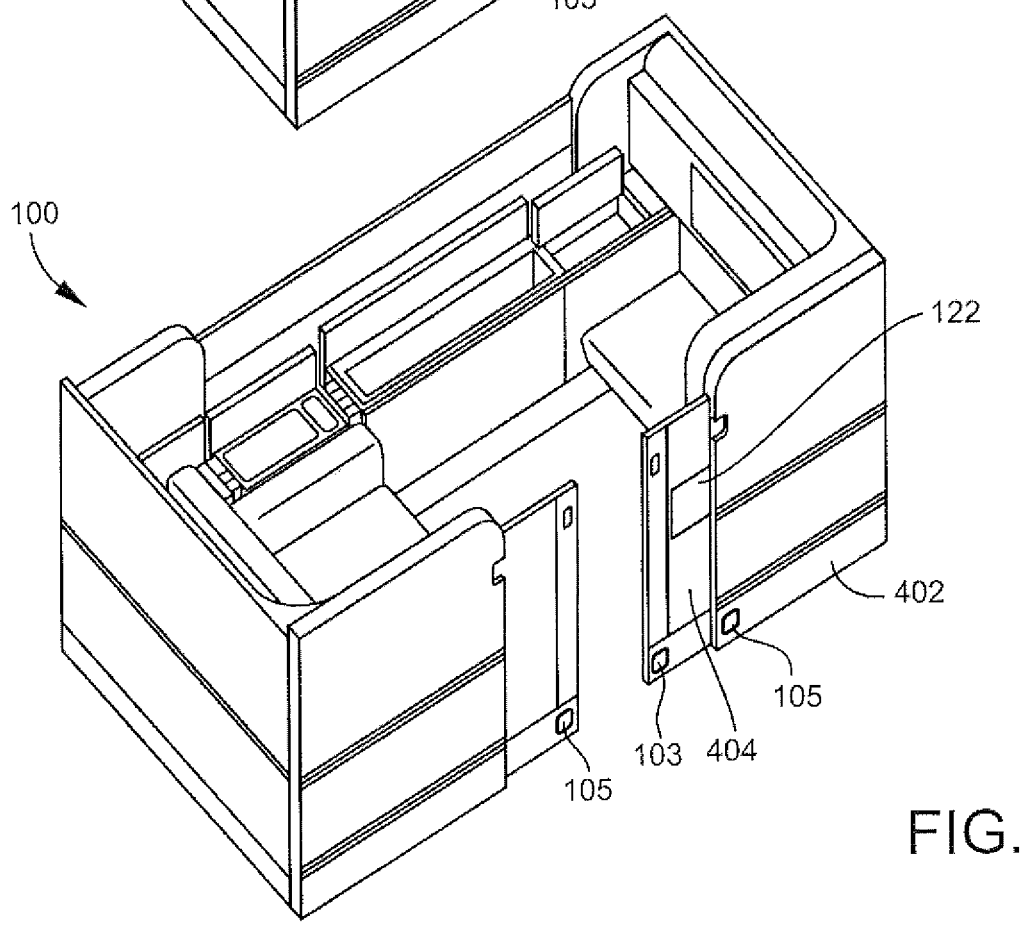
FIG. 11 is a perspective view of an exemplary embodiment according to the inventive concept.
Figure 12:
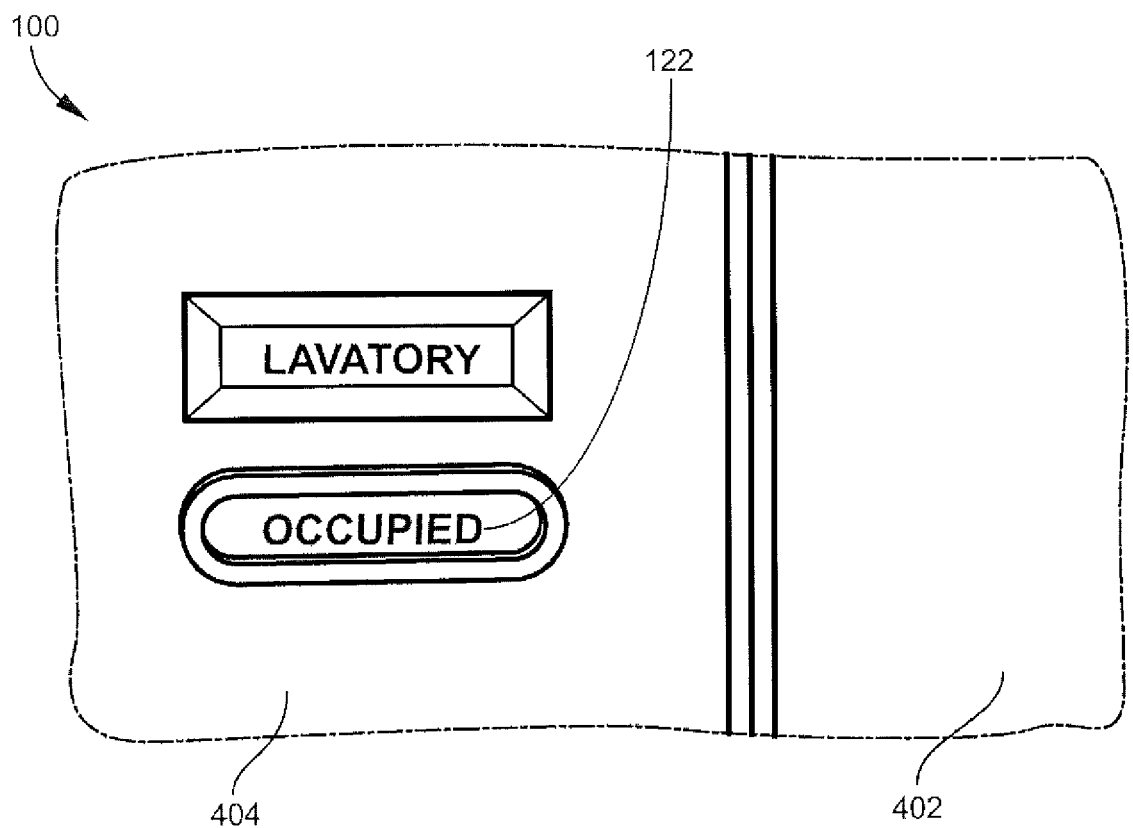
FIG. 12 is a partial front view of an exemplary embodiment according to the inventive concept.

Referring now to FIGS. 8-11, an embodiment of the inventive concept 100 is shown with respect to use in an enclosed premium aircraft passenger cabin suite. The suite has partition walls 402 and a sliding door 404 as shown in FIGS. 8 and 9 or a pair of sliding doors 404 as shown in FIGS. 10 and 11. The solid state power transmitter 103 may be attached to the partition wall 402 and the solid state power receiver 105 may be attached to the sliding door 404. When power from the aircraft is supplied to the solid state power transmitter 103, the induction loop of the power transmitter will create a oscillating magnetic field which will induce a flow of current through the receiving coil of the solid state power receiver and thereby supply power to a load 122. Lights such as LEDs may illuminate a "do not disturb" sign 122 which functions as the load. As specifically shown in FIGS. 10 and 11, the pairs of solid state power transmitters and solid state power receivers may be linked in a daisy chain across multiple moving parts such as with a pair of doors. In another related embodiment of the inventive concept 100, rather than the suite of FIGS. 8-11, the system may be employed on a wall 402 and a door 404 of an aircraft lavatory, as shown in FIG. 12, such that, when the door 404 is shut, the system causes the "occupied" indicator to illuminate.

Figure 13:
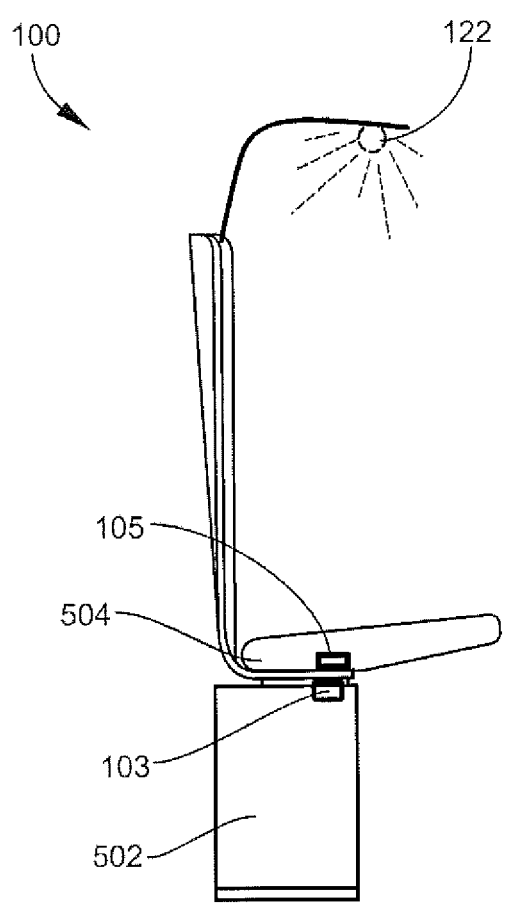
FIG. 13 is a side view of an exemplary embodiment according to the inventive concept.
Figure 14:
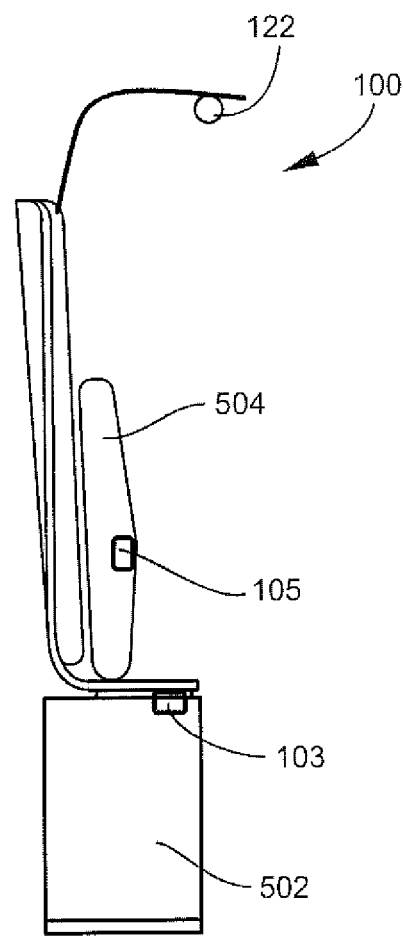
FIG. 14 is a side view of an exemplary embodiment according to the inventive concept.

Referring now to FIGS. 13 and 14, an embodiment of the inventive concept 100 is shown where the solid state power transmitter 103 is attached to a seat base 502 and the solid state power receiver 105 is attached to the seat cushion 504. Accordingly, reading lamp 122 may be powered on as shown in FIG. 13 or off as shown in FIG. 14 depending on the location of the seat cushion 504.

Figure 15:
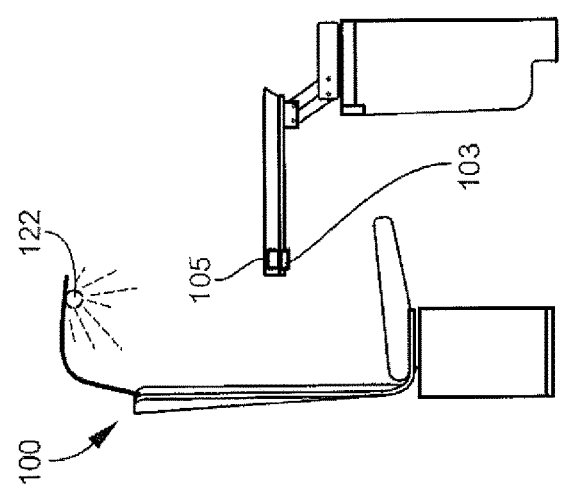
FIG. 15 is a side view of an exemplary embodiment according to the inventive concept.
Figure 16:
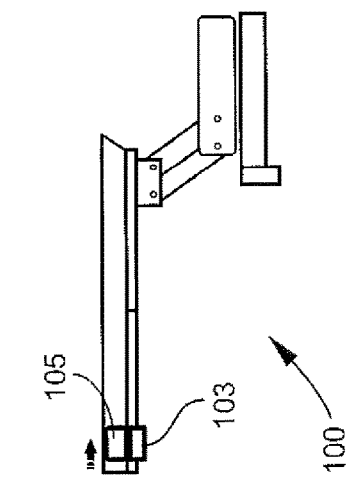
FIG. 16 is a side view of an exemplary embodiment according to the inventive concept.
Figure 17:
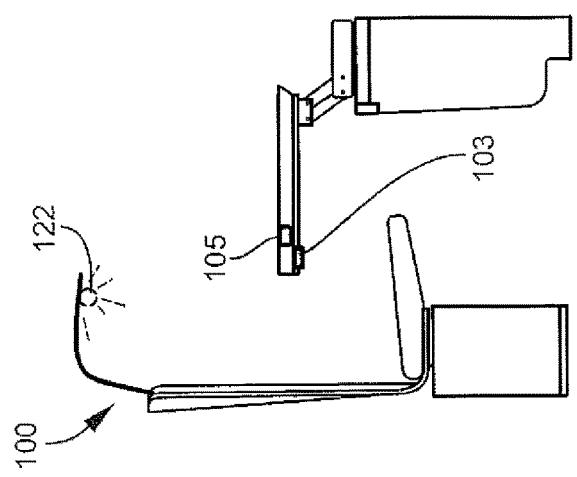
FIG. 17 is a side view of an exemplary embodiment according to the inventive concept.
Figure 18:
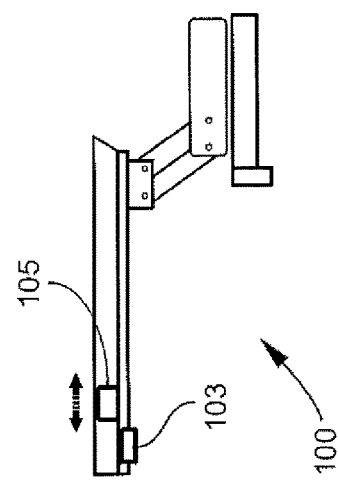
FIG. 18 is a side view of an exemplary embodiment according to the inventive concept.
Figure 19:
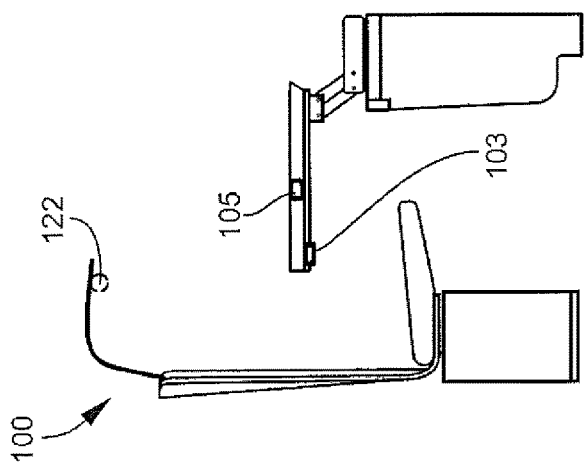
FIG. 19 is a side view of an exemplary embodiment according to the inventive concept.
Figure 20:
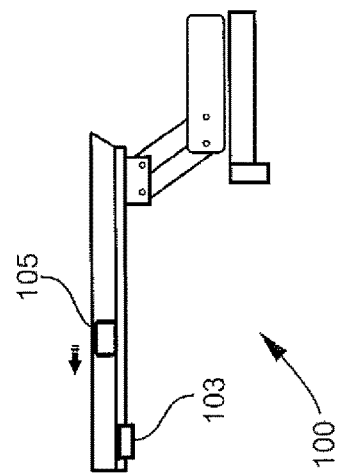
FIG. 20 is a side view of an exemplary embodiment according to the inventive concept.

Referring now to FIGS. 15-20, an embodiment of the inventive concept 100 is shown where the solid state power transmitter 103 in combination with the solid state power receiver is used to supply a dimming function to a load, such as the lamp 122 shown. As shown in FIGS. 15 and 16, the solid state power transmitter 103 is in close proximity to the solid state power receiver 105 and, therefore, supplies full power to lamp 122. As shown in FIGS. 17 and 18, the solid state power receiver 105 is positioned further away from the solid state power transmitter 103 than in FIGS. 15 and 16 but close enough so that some AC flow is induced resulting in diminished power to the lamp 122. As shown in FIGS. 19 and 20, the solid state power receiver 105 is poisoned far away from the solid state power transmitter 103 than in either FIG. 15-16 or 17-18. Indeed, the solid state power receiver 105 is so far from the solid state power transmitter 103 that no AC is induced in the receiver 105 and the lamp is not illuminated at all.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A system for wirelessly supplying electrical power to an aircraft cabin component, comprising:
   a first aircraft cabin component equipped with a solid state electrical power transmitter comprising an induction loop and adapted to produce an oscillating magnetic field when powered via a wired connection to a power supply;
   a second aircraft cabin component, movable relative to the first aircraft cabin component between a first position in which the second aircraft cabin component is positioned within the first aircraft cabin component and a second position in which the second aircraft cabin component is positioned outside of the first aircraft cabin component, equipped with a solid state electrical power receiver comprising a receiving coil, and adapted to induce a flow of alternating current to a load when the receiving coil is in proximity to the oscillating magnetic field; and
   a visual indicator attached to the second aircraft cabin component and electrically coupled to the solid state electrical power receiver, the visual indicator operable for being electrically activated when the second aircraft component is in the second position such that the solid state electrical power receiver is powered by the solid state electrical power transmitter, and the visual indicator when electrically activated being visible on at least one exterior surface of the second aircraft cabin component;
   wherein the first position corresponds to a stowed condition of the second aircraft cabin component and the second position corresponds to a deployed condition of the second aircraft cabin component, and wherein the second aircraft cabin component is movable between the first position in which the power receiver is out of operating range of the power transmitter, and the second position in which the power receiver is within operating range of the power transmitter, wherein the first and second aircraft cabin components are coupled in each of the first and second positions and remain coupled as the second aircraft cabin component moves between the first and second positions.

2. The system of claim 1 further comprising a plurality of intermediate positions between the first position and the second position wherein, when the second aircraft cabin component is in one of the plurality of intermediate positions, the flow of alternating current is diminished relative to the first position, and the visual indicator providing a first visual indication when the second aircraft component is in one of the plurality of intermediate positions, and a second visual indication, different from the first visual indication, when the second aircraft cabin component is in the first position.

3. The system of claim 1 wherein the second aircraft cabin component is moveably attached to the first aircraft component.

4. The system of claim 1 wherein the second aircraft cabin component comprises a tray table and a support member, and wherein the solid state electrical power receiver is positioned in the support member and the visual indicator is positioned in a surface of the tray table.

5. The system of claim 4 wherein the support member slidably engages the first aircraft cabin component.

6. A method of wirelessly supplying electrical power to aircraft cabin components comprising the steps of:
providing a first aircraft cabin component;
providing a second aircraft cabin component which is movable relative to the first aircraft cabin component between a first position in which the second aircraft cabin component is positioned within the first aircraft cabin component and a second position in which the second aircraft cabin component is positioned outside of the first aircraft cabin component;
attaching a solid state electrical power transmitter, comprising an induction loop, to the first aircraft cabin component;
attaching a solid state electrical power receiver, comprising a receiving coil, to the second aircraft cabin component;
attaching a visual indicator to the second aircraft cabin component and electrically coupling the visual indicator to the solid state electrical power receiver; and
connecting a power source to the solid state electrical power transmitter;
wherein the visual indicator is operable for being electrically activated when the second aircraft cabin component is in the second position such that the solid state electrical power receiver is powered by the solid state electrical power transmitter, and the visual indicator when electrically activated being visible on at least one exterior surface of the second aircraft cabin component;
wherein the first position corresponds to a stowed condition of the second aircraft cabin component and the second position corresponds to a deployed condition of the second aircraft cabin component, and wherein the second aircraft cabin component is movable between the first position in which the power receiver is out of operating range of the power transmitter, and the second position in which the power receiver is within operating range of the power transmitter, wherein the first and second aircraft cabin components are coupled in each of the first and second positions and remain coupled as the second aircraft cabin component moves between the first and second positions.

7. The method of claim 6 wherein the second aircraft cabin component comprises a tray table and a support member, and wherein the solid state electrical power receiver is positioned in the support member and the visual indicator is positioned in a surface of the tray table.

8. The method of claim 7 wherein the support member slidably engages the first aircraft cabin component.

* * * * *